(12) United States Patent
Parker (10) Patent No.: US 9,668,173 B2
(45) Date of Patent: May 30, 2017

(54) WIRELESS MULTICAST/BROADCAST INTEGRATION WITH CONTENT MANAGEMENT SYSTEM

(75) Inventor: Benjamin J. Parker, Foster City, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 704 days.

(21) Appl. No.: 13/411,028

(22) Filed: Mar. 2, 2012

(65) Prior Publication Data
US 2013/0229915 A1      Sep. 5, 2013

(51) Int. Cl.
*H04W 28/20*      (2009.01)
*H04W 28/26*      (2009.01)

(52) U.S. Cl.
CPC ............ *H04W 28/26* (2013.01); *H04W 28/20* (2013.01)

(58) Field of Classification Search
CPC .............................. H04W 28/20; H04W 28/26
USPC ........................................ 370/230, 329, 312
See application file for complete search history.

(56) References Cited

U.S. PATENT DOCUMENTS

| | | | |
|---|---|---|---|
| 7,116,682 B1* | 10/2006 | Waclawsky et al. | 370/468 |
| 2008/0072264 A1* | 3/2008 | Crayford | 725/86 |
| 2008/0198797 A1* | 8/2008 | Park et al. | 370/328 |
| 2008/0225778 A1* | 9/2008 | Vare et al. | 370/328 |
| 2010/0111103 A1* | 5/2010 | Dhesikan et al. | 370/468 |
| 2011/0078705 A1* | 3/2011 | Maclinovsky et al. | 719/318 |
| 2011/0145430 A1* | 6/2011 | Ha et al. | 709/231 |
| 2012/0069750 A1* | 3/2012 | Xing et al. | 370/252 |
| 2012/0163767 A1* | 6/2012 | Yuasa | 386/230 |
| 2012/0259994 A1* | 10/2012 | Gillies et al. | 709/231 |
| 2013/0104173 A1* | 4/2013 | Tjio et al. | 725/62 |
| 2014/0023088 A1* | 1/2014 | Polk et al. | 370/468 |

* cited by examiner

*Primary Examiner* — Parth Patel (57) ABSTRACT

A system is provided that can include one or more devices to: identify an event that has a predefined start time and end time, determine that a particular amount of bandwidth is needed for the event, and generate a notification that identifies the particular amount of bandwidth and the predefined start time and end time for the event, where the particular amount of bandwidth is reserved on a channel for the predefined start time and end time, for the event, in response to the notification.

18 Claims, 7 Drawing Sheets

| Amount of Bandwidth | Event Title | Duration | Location | Start Time | Stop Time | Type |
|---|---|---|---|---|---|---|
| 200 kps | Football | 3 hours | San Francisco | 1:00 PM | 4:00 PM | Live |
| 500 kps | Movie | 2 hours | N/A | On demand | --- | Recorded |
| 700 kps | Basketball | 4 hours | New York City | 7:00 PM | 11:00 PM | Live |
| *** | *** | *** | *** | *** | *** | *** |

FIG. 7

WIRELESS MULTICAST/BROADCAST INTEGRATION WITH CONTENT MANAGEMENT SYSTEM

BACKGROUND

Wireless service provider networks transport wireless network traffic associated with a variety of services, applications, and content. The network traffic may include voice, text, video, and/or data. Network traffic is ever increasing with the increasing use of mobile devices for streaming and downloading multimedia content.

Network traffic can increase during certain times, such as during popular events, like sporting events. During these certain times, network traffic can become overloaded and can cause lag or delay, and decrease a user's overall experience on the network.

DETAILED DESCRIPTION OF PREFERRED EMBODIMENTS

The following detailed description refers to the accompanying drawings. The same reference numbers in different drawings may identify the same or similar elements.

A system and/or method, described herein, may provide proactive, rather than reactive, network congestion management. The system and/or method can provide proactive network management by reserving bandwidth for events (e.g., scheduled multimedia transmissions) prior to the event occurring, which can reduce network traffic problems before they occur (e.g., at the start of the events).

Wireless networks can transmit multimedia content using a unicast system (one-to-one) or a multimedia broadcast multicast system (MBMS) (one-to-multiple). In order to conserve wireless network resources, a MBMS can be used. A MBMS can use the fewest network resources because a single channel can serve multiple user devices, while a unicast system uses multiple channels to serve multiple user devices. For example, transmitting multimedia content to five user devices would use five channels for unicast compared to just a single channel for a MBMS.

A MBMS can transfer and/or stream video and audio to multiple user devices using fewer network resources by transferring data from a single source to a group of one or more radio cells simultaneously. User devices in radio cells can subscribe or join a transmission to receive the transmission simultaneously with other user devices in the same or different radio cells.

A MBMS can provide this efficient transmission of data by using a scheduling system to schedule and deliver content to a management system. The management system can be used to deliver the content to user devices and to control delivery channels and their bandwidth sizes to deliver the content to the user devices. In one implementation, a scheduling system can transmit content to a management system. The management system can deliver the content to user devices on channels with particular bandwidth set by the management system. For example, the scheduling system can send a signal that includes five programs, and the management system can provide the five programs to user devices on five separate channels of particular bandwidth.

Additionally, the scheduling system can deliver scheduling information to the management system. The scheduling information can include start and end times for programs, popularity of programs, locations for the programs, or other information that can be used by the management system to set particular bandwidth for channels. Based on the scheduling information, the management system can adjust the bandwidth during particular times to accommodate programming based network needs. For example, if more bandwidth is needed in a first channel, and less is needed in a second channel, then the management system can adjust the bandwidth on the first and second channels to provide more bandwidth to the first channel, and less bandwidth to the second channel.

In one implementation, the scheduling system can reserve bandwidth either for an existing channel or a new channel if there is a program that might cause network traffic issues. For example, the scheduling system can reserve bandwidth for transmitting a program by sending a notification of the event to the management system. By using the scheduling system to notify the management system of the popular event, the management system can prepare for the event by reserving bandwidth to reduce network problems that may be caused by increased network traffic by user devices wanting access to the popular event. Network traffic can be controlled by controlling bandwidth on one or more channels to use more bandwidth for the channel carrying the event. In implementations discussed herein, the scheduling system can include broadcast multicast service centers (hereinafter referred to collectively or individually as "BMSC") and the management system can be a content management system (hereinafter referred to collectively or individually as "CMS").

Figure 1:
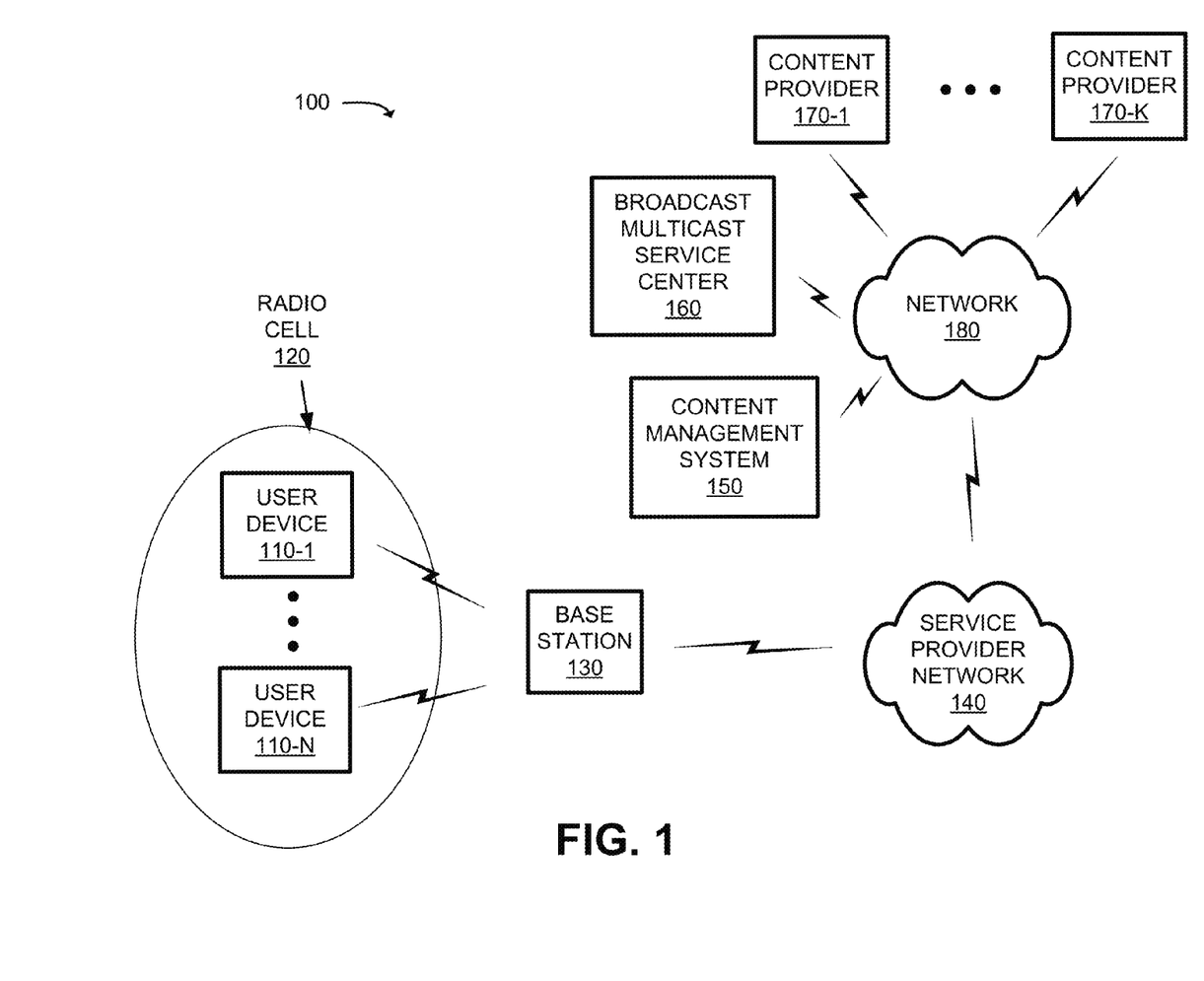
FIG. 1 is a diagram of an example environment in which systems and/or methods, described herein, may be implemented.

FIG. 1 is a diagram of an example environment 100 in which systems and/or methods described herein may be implemented. As shown in FIG. 1, environment 100 may include user devices 110-1 . . . 110-N (N≥1) (hereinafter referred to collectively as "user devices 110" and individually as "user device 110") in radio cell 120, base station 130, service provider network 140, CMS 150, BMSC 160, content providers 170-1 . . . 170-K (K≥1) (hereinafter referred collectively as "content providers 170" and individually as "content provider 170"), and network 180. The number of devices illustrated in FIG. 1 is provided for explanatory purposes only. In practice, there may be additional devices; fewer devices; different devices; or differently arranged devices than illustrated in FIG. 1. CMS 150 and BMSC 160 could be combined into a single device. Each of CMS 150 and BMSC 160 could be implemented as multiple co-located or remotely located devices.

Also, in some implementations, one or more of the devices of environment 100 may perform one or more functions described as being performed by another one or more of the devices of environment 100. Devices of environment 100 may interconnect via wired connections, wireless connections, or a combination of wired and wireless connections.

User devices 110 can include any computation or communication device that can communicate via base station 130. In one embodiment, user device 110 can include a wireless mobile communication device (e.g., a radiotelephone, a smart phone), a computer (e.g., a laptop, a tablet, a netbook), a gaming device, a personal digital assistant (PDA), a video streaming or downloading device (e.g., a set top box, a DVD player with streaming ability, a streaming player), or another type of mobile computation or communication device.

Radio cell 120 can be a coverage or service area (e.g., "cell") in which a radio signal from a radio transmitter can be transmitted. A radio transmitter can transmit signals a certain distance (e.g., outer edge of cell) based on terrain (e.g., flat areas or hilly areas), objects that can attenuate a signal (e.g., buildings, hills, or trees), and transmitter strength. A radio cell 120 in a flat area with fewer buildings would tend to be larger (e.g., the radio transmitter signals would reach further to create a larger transmitting area) than a radio cell 120 in a hilly area with more buildings.

Base station 130 may include one or more devices that receive, process, and/or transmit traffic, such as voice, video, audio, text, and/or other data, destined for and/or received from user device 110. Base station 130 may send traffic to and/or receive traffic from user device 110 within a radio cell 120.

Service provider network 140 may include one or more wired and/or wireless networks via which user devices 110 can communicate and/or receive content. For example, service provider network 140 may include a cellular network, the Public Land Mobile Network (PLMN), a second generation (2G) network, a third generation (3G) network, a fourth generation (4G) network (e.g., a long term evolution (LTE) network), a fifth generation (5G) network, and/or another network. Additionally, or alternatively, service provider network 140 may include a public switched telephone network (PSTN), a wide area network (WAN), a metropolitan area network (MAN), an ad hoc network, an intranet, a fiber optic-based network (e.g., a fiber optic service (FiOS) network), and/or a combination of these or other types of networks.

CMS 150 may include one or more devices that gather, process, search, store, and/or provide information in a manner similar to that described herein. CMS 150 may perform operations associated with content distribution within environment 100. For example, CMS 150 may perform caching operations by obtaining content from content provider 170 and temporarily storing the content in a memory associated with CMS 150. CMS 150 may retrieve particular content, from the memory, in response to a request to receive the particular content from user device 110.

CMS 150, which can be associated with service provider network 140, can be used to obtain content from one or more content providers 170, to temporarily store the content, and/or to transport the content to user device 110 in a manner that minimizes utilization of bandwidth, processing, and/or other resources associated with environment 100 and/or service provider network 140. CMS 150 may temporarily store content, obtained from the one or more content providers 170, that is targeted to user device 110. The content may be targeted to user device 110 based on a subscription or selection by user device 110, a type of user device 110, a location of the user device 110, usage patterns of user device 110, preferred content and/or genres associated with user device 110 or a user of user device 110, etc.

As described herein, CMS 150 may monitor traffic flowing to and/or from service provider network 140 to determine whether a condition (e.g., congestion, jitter, packet delay and/or loss, mis-ordered packets, etc.) exists. CMS 150 may perform an operation that avoids and/or remedies the condition (e.g., reserve or adjust bandwidth to accommodate demand by user devices 110). For example, CMS 150 can adjust particular bandwidth assigned to channels to avoid and/or remedy congestion or other conditions.

As also described herein, CMS 150 may monitor incoming and/or outgoing traffic, being carried by service provider network 140, to obtain information associated with traffic sent to and/or received from user device 110. CMS 150 may use the information associated with the traffic to identify and/or develop a community of interest (COI) associated with user device 110. The COI may identify preferred user devices 110 with which user device 110 communicates, preferred content providers 170 from which user device 110 and/or other user devices 110 obtain content, preferred content genres associated with user device 110 and/or other user devices 110, etc. CMS 150 may use the information, associated with the COI, to assist content providers 170 to target content to user device 110 and/or other user devices 110 associated with the COI, as well as optimize and adjust bandwidth based on the COI and/or an event that may be popular for the COI.

As further described herein, CMS 150 may perform an operation to optimize the content being transported to user device 110. CMS 150 may, for example, convert the content into a tailored format that can be easily rendered on a variety of types of user devices 110 (e.g., 240p resolution video for a smart phone).

CMS 150 may process the content to ensure that the traffic is optimally configured for transmission to user device 110 (e.g., converting packets to a maximum transmission unit (MTU), performing packet compression, etc.). CMS 150 may transmit the content at a bandwidth and/or data rate that maximizes throughput and/or minimizes congestion.

CMS 150 may receive a notification that a condition will occur, has occurred, or is about to occur, within a cell 120 associated with base station 130, and CMS 150 may take preemptive or corrective action, in response to the notification, such as by transporting content to user device 110 in a manner that remedies, mitigates, or avoids the condition. CMS 150 may process content in order to ensure that the content is sent to user devices 110 in a manner that satisfies a minimum quality of service (QoS) threshold. CMS 150 may, for example, convert content into a format (e.g., a lower video resolution) and/or protocol based on a type of user device 110. In another example, CMS 150 may process the content by sending the content to user devices 110 at a bandwidth, data rate, and/or packet size that maximizes network throughput without inducing congestion, jitter, and/or other conditions.

BMSC 160 may include one or more computation and/or communication devices that gather, process, search, store, and/or provide information. For example, BMSC 160 may include a server device, a workstation computer, a network device, etc.

BMSC 160 may provide scheduling information to control the distribution of content or media. For example, BMSC 160 can be used to assign a particular number of data channels per content according to a schedule. In an example implementation, BMSC 160 may reserve bandwidth before an event begins, and may transmit data (e.g., multimedia data) from content provider 170 when the event begins.

BMSC 160 can provide a mechanism for communicating broadcast and multicast attributes to CMS 150 including a notification of an upcoming event, so that CMS 150 can adjust the bandwidth on a data channel to accommodate the upcoming event. For example, BMSC 160 may send signals, messages, or alerts concerning an upcoming event to CMS 150, and CMS 150 can adjust the bandwidth for one or more channels to maximize network throughput without inducing congestion, jitter, and/or other conditions.

Additionally, or alternatively, BMSC 160 may retrieve particular content, from the memory of BMSC 160. For example, BMSC 160 can receive content from content provider 170, store the content until a scheduled time or other condition, and provide the content to CMS 150 for distribution to user device 110.

Content providers 170 may include any type or form of content providers. For example, content providers 170 may include free television broadcast providers (e.g., local broadcast providers, such as NBC, CBS, ABC, and/or Fox), for-pay television broadcast providers (e.g., TNT, ESPN, HBO, Cinemax, CNN, etc.), on-demand content providers (e.g., FiOS, cable, and/or satellite service providers), and/or Internet-based content providers (e.g., YouTube, Vimeo, Netflix, Hulu, Veoh, etc.) that stream content from web sites and/or permit content to be downloaded (e.g., via progressive download, etc.). Content providers 170 may produce media streams (e.g., video broadcasts). A "media stream," as used herein, may refer to stream of content that includes video content (e.g., a video stream), audio content (e.g., an audio stream), textual content (e.g., a textual stream), and/or any combination of video content, audio content, or textual content.

Network 180 may include any type of network. For example, network 180 may include Packet Data Networks (PDNs), such as the Internet or a Session Initiation Protocol (SIP) based Internet Protocol (IP) Multimedia Core Network Subsystem (IMS) network. Network 180 may also include a Local Area Network (LAN), a wide area network (WAN), such as a cellular network, a satellite network, a broadcast television based network, a private WAN, or a combination of the Internet and a private WAN, that is used to transport data. Although shown as a single element in FIG. 1, network 180 may include a number of separate networks that function to provide content to service provider network 140.

Figure 2:
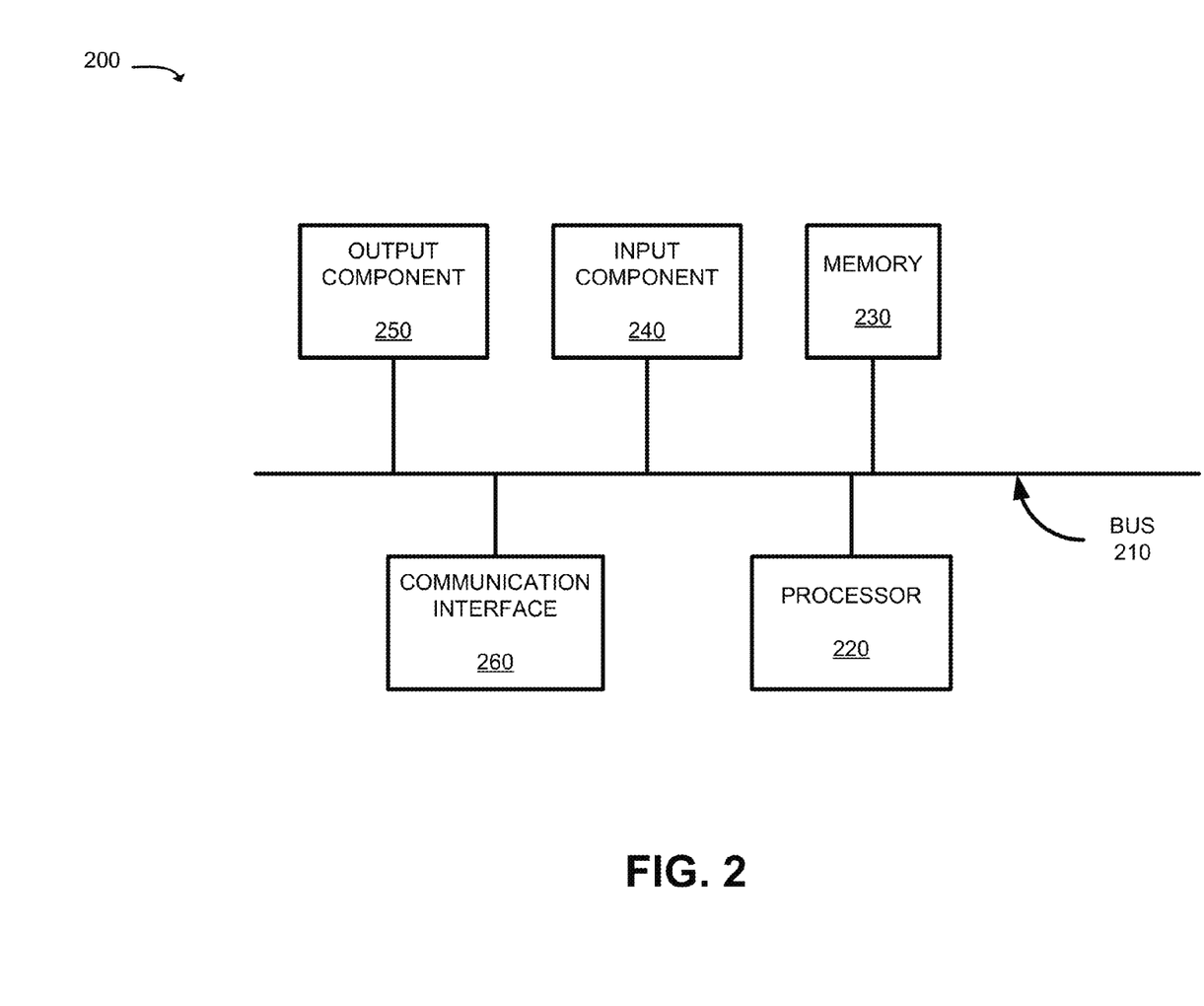
FIG. 2 is a diagram of example components of one or more of the devices of FIG. 1.

FIG. 2 is a diagram of example components of a device 200 that may correspond to user device 110, base station 130, CMS 150, BMSC 160, and/or content provider 170. Alternatively, each of user device 110, base station 130, CMS 150, BMSC 160, and/or content provider 170 may include one or more devices 200.

Device 200 may include a bus 210, a processor 220, a memory 230, an input component 240, an output component 250, and a communication interface 260. Although FIG. 2 shows example components of device 200, in other implementations, device 200 may contain fewer components, additional components, different components, or differently arranged components than depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path that permits communication among the components of device 200. Processor 220 may include a processor, microprocessor, or processing logic that may interpret and execute instructions. Memory 230 may include any type of dynamic storage device that may store information and instructions, for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 260 may include mechanisms for communicating with another device or system via a network, such as service provider network 140. In one alternative implementation, communication interface 260 may be a logical component that includes input and output ports, input and output systems, and/or other input and output components that facilitate the transmission of data to other devices.

Device 200 may perform certain operations relating operations associated with environment 100. Device 200 may perform these operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
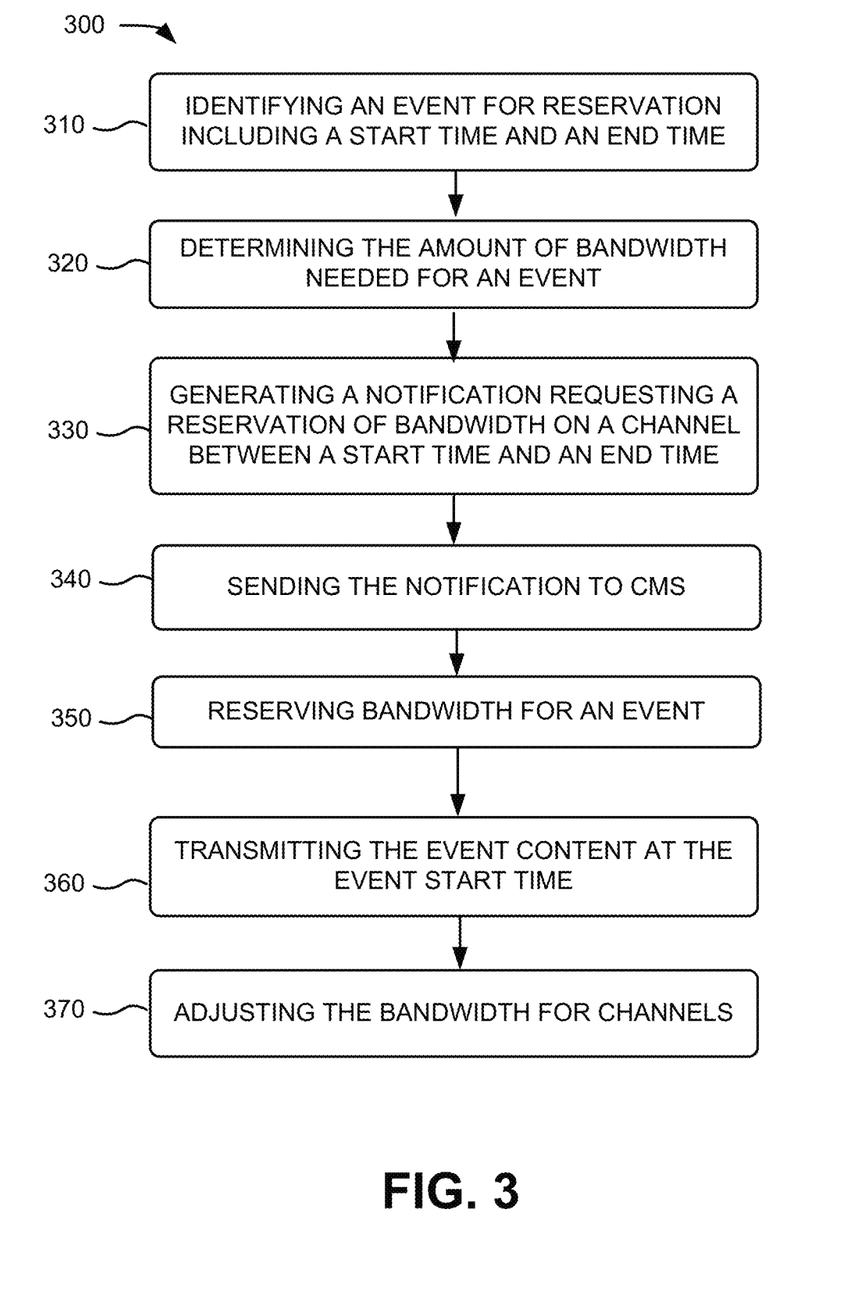
FIG. 3 is a flowchart of an example process for reserving bandwidth according to implementations described herein.

FIG. 3 is a flowchart of an example process 300 for reserving bandwidth according to an implementation described herein. In one implementation, process 300 can be performed by CMS 150 and/or BMSC 160. In another example implementation, process 300 may be performed by a device or collection of devices separate from, or in combination with, CMS 150 and/or BMSC 160.

In FIG. 3, process 300 is associated with reserving bandwidth for an event with particular bandwidth requirements, a start time, and an end time. By using process 300, appropriate levels of bandwidth can be reserved in advance of an event so that before the event occurs, service provider network 140 can proactively prepare for the increased traffic rather than service provider network 140 retroactively responding to the increased traffic after the event begins.

Process 300 may include identifying events for reservation (block 310). Events, as used herein, can include transmitted programs that have a particular start time and a particular end time and can be subscribed to by user devices 110.

Events can be identified by notifications, such as signals, messages, or alerts, from content providers 170 to BMSC 160. For example, content provider 170 can provide a signal with upcoming programs and can indicate that one or more programs may be events because they require increased bandwidth due to a predicted level of popularity.

Events can also be identified by an administrator, such as a network administrator. For example, a network administrator can decide that a particular program has the potential of causing network congestion, and the network administrator can manually identify an event for reservation.

Figure 4:
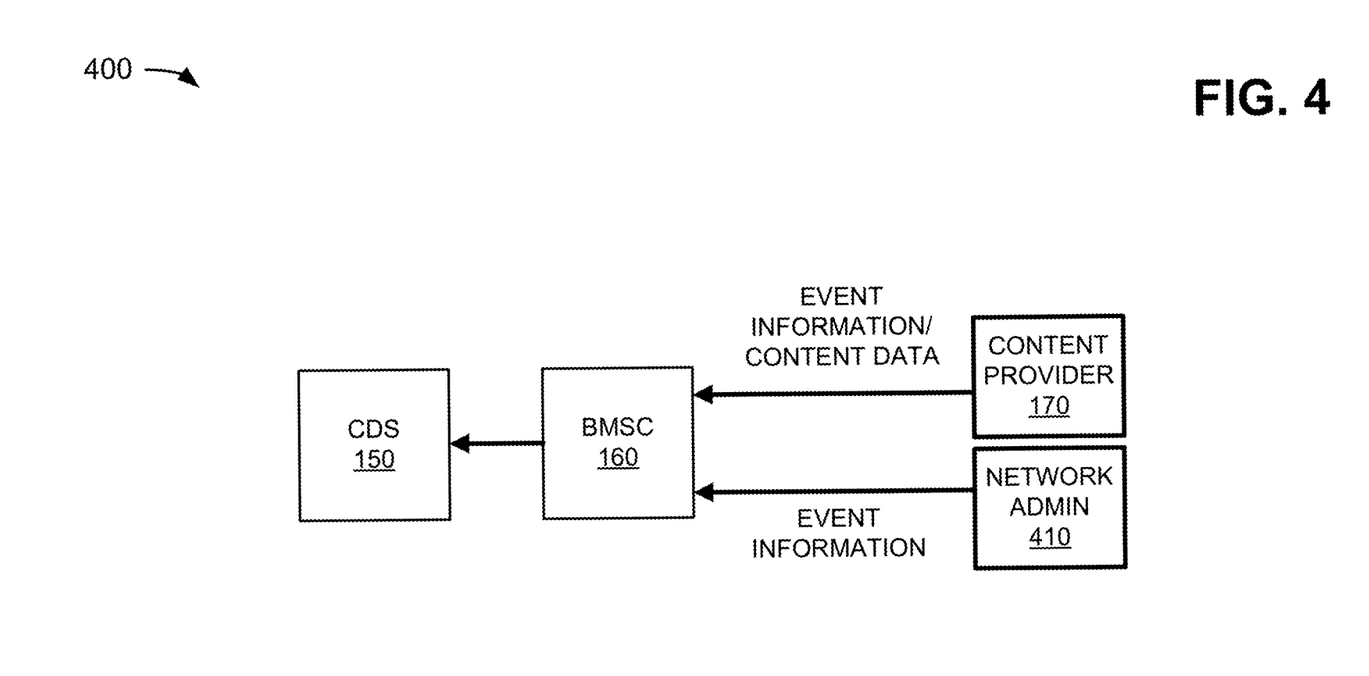
FIG. 4 is an example flow diagram for sending event information and content data according to implementations described herein.

FIG. 4 is an example flow diagram 400 for sending event information and content data according to implementations described herein. As shown, flow diagram 400 can include content provider 170, BMSC 160, and CDS 150, all of which may include the features described above in connection with, for example, one or more of FIGS. 1-3. Flow diagram 400 can also include interaction by network administrator 410, who may manually interact with BMSC 160 and CDS 150 for any reason.

As shown in FIG. 4, content provider 170 can provide event information and/or content data to BMSC 160. Content provider 170 can specifically state that a program should be treated differently than other programming, such as by indicating that the program is "an event" or that the program requires additional bandwidth. Similarly, network administrator 410 can also specifically state that a program should be treated differently than other programs, and can indicate that the program is "an event" or that the program requires additional bandwidth. Network administrator 410 can also change the bandwidth for a channel that the program is assigned to at any time during the program. For example, if network administrator 410 notices network congestion caused by the program, then network administrator 410 can send a signal to BMSC 160 to have CDS 150 adjust the bandwidth for one or more channel affected by or affecting network congestion.

Events can also be identified based on bandwidth requirements. In one implementation, programs from content provider 170 can be assigned to a program channel. The program channel can be assigned a predetermined bandwidth based on content types or demand, for example. An event can be identified based on an increase in bandwidth requirements on the program channel. For example, if the future demand for a program requires a higher bandwidth than the bandwidth assigned to the program channel, then the program can be identified as an event that requires more bandwidth than the assigned bandwidth of the program channel.

Process 300 may include determining the amount of bandwidth needed for an event (block 320). The amount of bandwidth needed for the event can be determined based upon one or more factors, including: the number of user devices 110 that will be accessing or are accessing the event (e.g., the number of user devices 110 pre-ordering, subscribing, or joining the channel for the event), content provider 170 information regarding demand for the event, bandwidth needs for previous events similar to the event, or other factors that can be used to determine demand and in turn the amount of bandwidth needed for the event. Additionally, the bandwidth needed can be any amount of bandwidth that is required to support the event, and can change throughout the event (e.g., user devices 110 joining and leaving the channel assigned to the event).

Process 300 may include generating a notification requesting a reservation of bandwidth between a start time and an end time (block 330). In one implementation, BMSC 160 can generate a notification requesting a reservation for a specific amount of bandwidth between the start time and the end time for the event. For example, BMSC 160 can request 700 kbps (e.g., a 480p video stream) from 8:00 pm-10:00 pm on January 4.

In another implementation, BMSC 160 can request a reservation of bandwidth using relative bandwidth demands for an event and other programming. In one implementation, CMS 150 can allocate bandwidth for a channel with the event and channels with other programming relative to their bandwidth demands. For example, if CMS 150 has a first channel that has a higher bandwidth demand than a second channel's bandwidth demand during the time period of an event, then CMS 150 can assign a higher bandwidth for the first channel than the second channel during the time period of the event.

Figure 5:
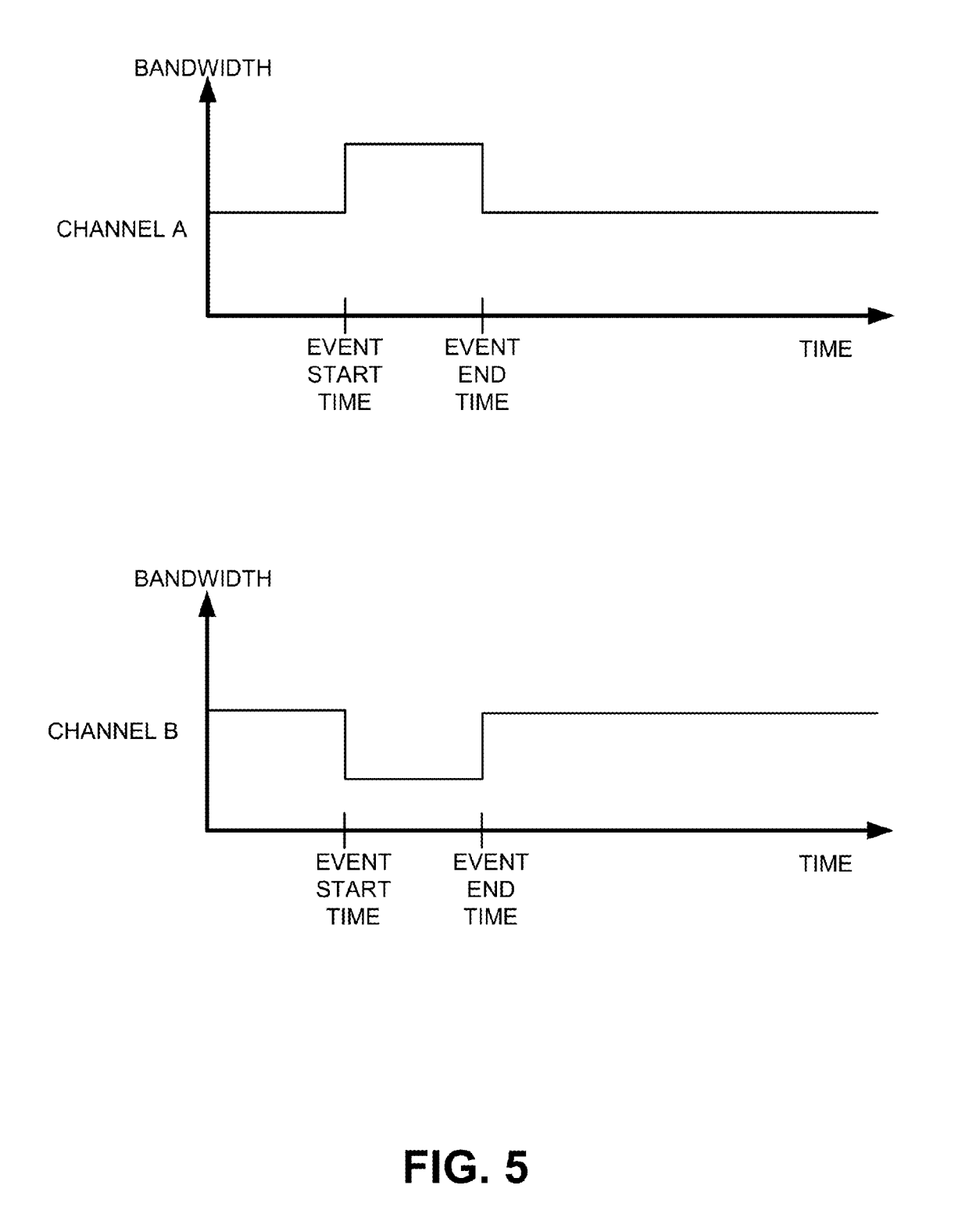
FIG. 5 is a diagram of an assignment of bandwidth according to an implementation described herein.

FIG. 5 is a diagram of an assignment of bandwidth according to an implementation. In FIG. 5, a first channel that transmits multimedia content associated with an event with higher bandwidth requirements is represented by "Channel A," and a second channel that transmits other programming with lower bandwidth requirements during the event is represented by "Channel B." Channel A and Channel B can be assigned particular amounts of bandwidth before the event start time and after the event end time, and can have increased bandwidth in Channel A during the event (e.g., between the event start time and the event end time), while Channel B can have decreased bandwidth during the event.

Process 300 may include sending the notification to CMS 150 (block 340). In one implementation, BMSC 160 can automatically notify CMS 150 by sending a signal requesting a bandwidth reservation. In another implementation, network administrator 410 can manually enter a notification into CMS 150. For example, if a live transmission of a video of the Super Bowl is scheduled, but the number of pre-order subscribers does not appear to reflect the interest that will probably occur, then network administrator 410 can manually notify CMS 150 of the bandwidth requested, along with the start time and end time for the scheduled transmission of the video.

The notification to CMS 150 can be a signaling message from BMSC 160 to CMS 150. In one implementation, the signaling message can be a structured packet and, the packet can be sent using transmission control protocol (TCP) or user datagram protocol (UDP). Additionally, the packet can require acknowledgement from an acknowledgement system or the packet can be re-sent if necessary (e.g., if a certain or a random amount of time passes without receipt of the acknowledgement), and the packet can be sent from a policy and charging rules function (PCRP) (e.g., a policy server) in any structured format (e.g., GX Developer, GXLite, or via Extensible Markup Language (XML), Network Configuration Protocol (Netconf), IPFix).

Process 300 may include reserving bandwidth for an event (block 350). CMS 150 can reserve bandwidth by assigning bandwidth to a new channel or assigning additional bandwidth to an existing channel. In one implementation, CMS 150 can receive a notification from BMSC 160 requesting a reservation of bandwidth for a program, and CMS 150 can determine whether the program has a channel assigned. For example, CMS 150 can identify whether a channel is assigned to the program using a program guide, generated by CMS 150 or provided by another server, to determine if the program is assigned to a channel during the program times. If there is no existing channel assigned to the program, then CMS 150 can assign a new channel, and also assign a bandwidth to the channel.

In one implementation, CMS 150 can also determine whether the bandwidth needed for the program is sufficient in the new or existing channel. For example, CMS 150 can compare the assigned bandwidth to the program channel to the request for reservation of bandwidth for the program channel from BMSC 160. If the assigned bandwidth is not sufficient, then CMS 150 may need to provide additional bandwidth for the program channel.

If additional bandwidth is needed to accommodate the request for reservation of bandwidth from BMSC 160, CMS 150 can provide new or additional bandwidth for the program channel by allocating available, unassigned bandwidth or re-assigning bandwidth from existing channels. In one implementation, CMS 150 can aggregate all available, unassigned bandwidth and allocate the available bandwidth to the program channel. The allocation of the available, unassigned bandwidth can be assigned according to demand before, during, and/or after an event. The available, unassigned bandwidth can be reserved for during the event, and can be returned to being available and unassigned after the event.

In one implementation, additional bandwidth can be allocated from bandwidth re-assigned from existing channels to the program channel. For example, CMS 150 can take bandwidth from a lower demand channel and move the bandwidth to a higher demand channel, such as the program channel.

In another implementation, bandwidth for a program channel can be controlled by CMS 150 within one or more specific radio cells 120 and not within other radio cells 120. For example, one or more specific radio cells 120 may be subject to higher bandwidth requirements than other radio cells 120 because demand for a program is higher within the one or more specific radio cells 120 than the other radio cells 120. For example, a program channel transmitting a college football game may have higher bandwidth requirements within the specific radio cells 120 surrounding the home team's stadium than the other radio cells 120 that are distant to the home team's stadium. Additionally, bandwidth can be allocated from available bandwidth or re-assigned from existing channels by CMS 150 within the one or more specific radio cells 120, and not within other radio cells 120.

Figure 6:
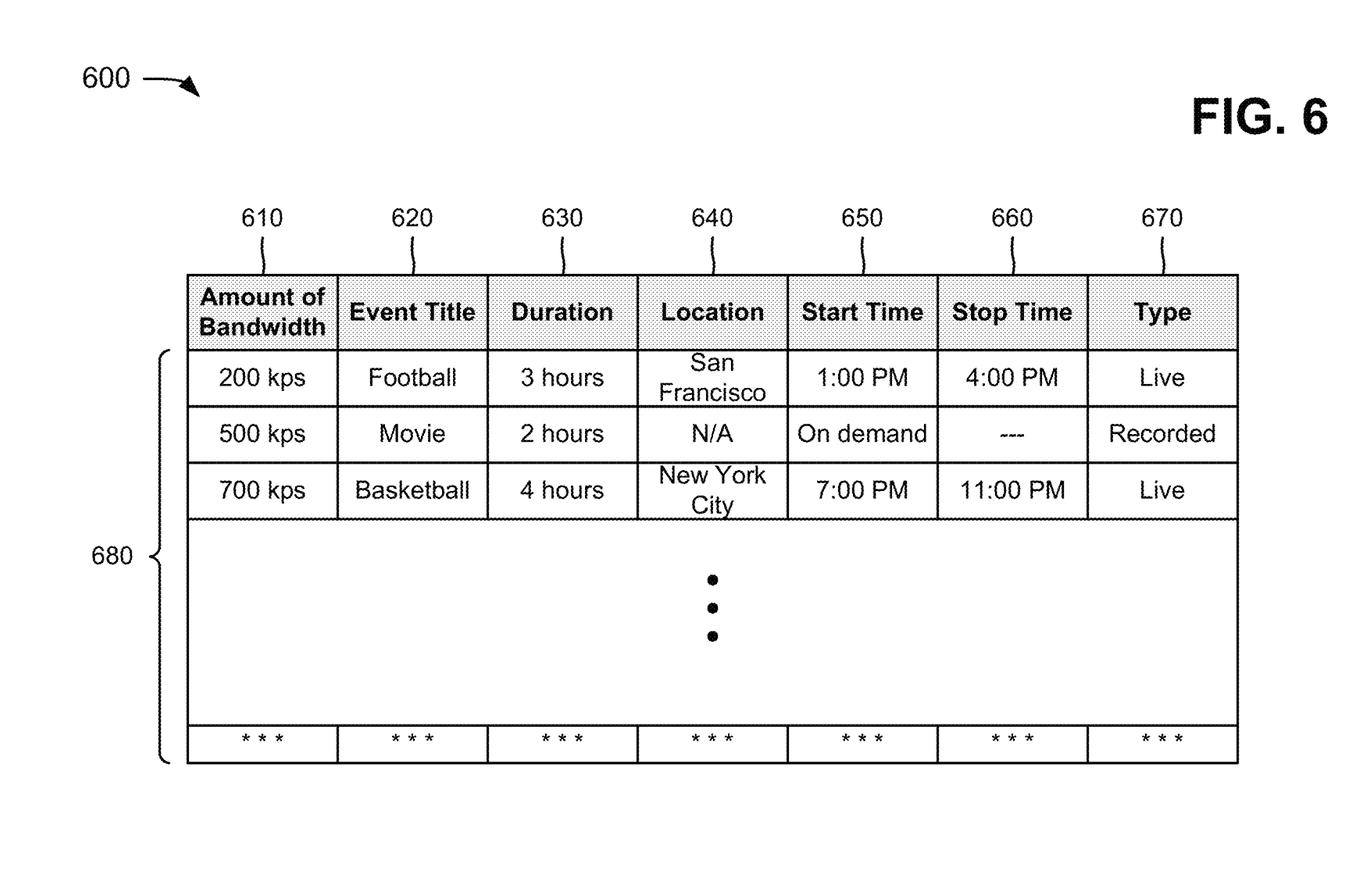
FIG. 6 is a diagram of an example database for managing event information according to an implementation described herein.

FIG. 6 is a diagram of an example database 600 for managing event information according to an implement described herein. As illustrated, database 600 may include a variety of information associated with live and recorded programs that are deemed to be events. For example, database portion 600 may include an amount of bandwidth field 610, an event title field 620, a duration field 630, a location field 640, a start time field 650, a stop time field 660, a type field 670, and/or a variety of entries 680 associated with fields 610-670.

Amount of bandwidth field 610 may include amounts of bandwidth that are requested for particular content. The amounts of bandwidth can be any amount that can be accommodated by the CDS 150 for a channel. As shown in FIG. 6, requested amount of bandwidth field 610 may include low resolution bandwidth requests (e.g., 200 kps), medium resolution bandwidth requests (e.g., 500 kps), high resolution bandwidth requests (e.g., 700 kps), or any other amount of bandwidth requests. Additionally, the requested bandwidth field 610 can be adjusted to accommodate event popularity in that more bandwidth can be assigned for more popular events to reduce network congestion, as well as increase resolution or other qualities that may increase the QoS to user device 110.

Event title field 620 may include titles of the events. As shown in FIG. 6, the first event may include a title of "Football," the second event may include a title of "Movie," and the third event may include a title of "Concert."

Duration field 630 may include durations of the events identified in event ID field 610. For example, as shown in FIG. 6, the first event may have a duration of "3 hours," the second event may include a duration of "2 hours," and the third event may include a duration of "4 hours."

Location field 640 may include locations of the events identified in event ID field 610. As shown in FIG. 6, the first event may be located at "San Francisco," the second event may not be associated with a location (e.g., since the second event is a recorded movie), and the third event may be located at "New York City." Location field 640 can be used to assist BMSC 160 to indicate to CDS 150 which radio cells 120 may have additional distribution issues that may need attention. For example, the first event may cause network congestion in radio cells 120 within San Francisco, but may not cause network congestion in radio cells 120 within other markets.

Start time field 650 may include start times of the events identified in event ID field 610. For example, as shown in FIG. 6, the first event may include a start time of "1:00 PM," the second event may not include a start time (e.g., since the second event is a recorded movie that may be viewed "On demand"), and the third event may include a start time of "7:00 PM."

Stop time field 660 may include stop times of the events identified in event ID field 610. For example, as shown in FIG. 6, the first event may include a stop time of "4:00 PM," the second event may not include a stop time (e.g., since the second event is a recorded movie that may be viewed "On demand"), and the third event may include a stop time of "11:00 PM."

Type field 670 may include types associated with the events identified in event ID field 610. As shown in FIG. 6, for example, the first event may be a "Live" event, the second event may be a "Recorded" event, and the third event may be a "Live" event.

Although FIG. 6 shows example information that may be provided in database portion 600, in other implementations, database portion 600 may contain less information, different information, differently arranged information, and/or additional information than depicted in FIG. 6.

Process 300 may include transmitting event content at the event start time (block 360). In one implementation, BMSC 160 can transmit the event content to CMS 150 and CMS 150 can use the reserved bandwidth to distribute the event content to user devices 110. In one implementation, content provider 170 can provide event content to CMS 150, and CMS 150 can distribute the event content to user devices. In another example, content provider 170 can provide event content directly to user devices 110 using CMS 150 to direct the event content to cells 120 and user devices 110. In another example, BMSC 160 can store event content from content provider 170, and can provide event content to CMS 150 to distribute when the start time occurs.

Process 300 may include adjusting the bandwidth for one or more channels (block 370). Adjusting the bandwidth for one or more channels can be done by CMS 150. CMS 150 can adjust bandwidth as reserved by BMSC 160, re-assess each channel's bandwidth requirements, and allocate bandwidth to increase or decrease bandwidth accordingly at any time before, during, or after the event.

In one implementation, the bandwidth for channels can be adjusted to pre-event levels or new levels based upon the bandwidth demands of the one or more channels. For example, CMS 150 can adjust the bandwidth for a channel to downward when event ends due to a decreased of bandwidth for the channel. As another example, CMS 150 can adjust the channel to pre-event levels at the scheduled event ending time or at the actual end of the event based on the channel returning to bandwidth requirements similar to pre-event bandwidth requirements.

In another implementation, the bandwidth of the channel can be adjusted downwards during the event. For example, adjusting the bandwidth for the channel can occur during the event, if subscribers join or leave the channel during the event.

In another implementation, network administrator 410 can manually adjust the bandwidth before, during, or after the event. Network administrator 410 can send a signal or message to CDS 150 or BMSC 160 to manually adjust the bandwidth for one or more channels. Reasons that network administrator 410 may want to manually adjust the bandwidth for one or more channels can include accommodating network issues (e.g., congestion, excess bandwidth, problems in network 170, or problems in service provider network 140, etc.) and accommodating other events (e.g., additional programs occurring at the same time that may also require additional bandwidth, programs that before or after the event starts and may require additional bandwidth, etc.).

Figure 7:
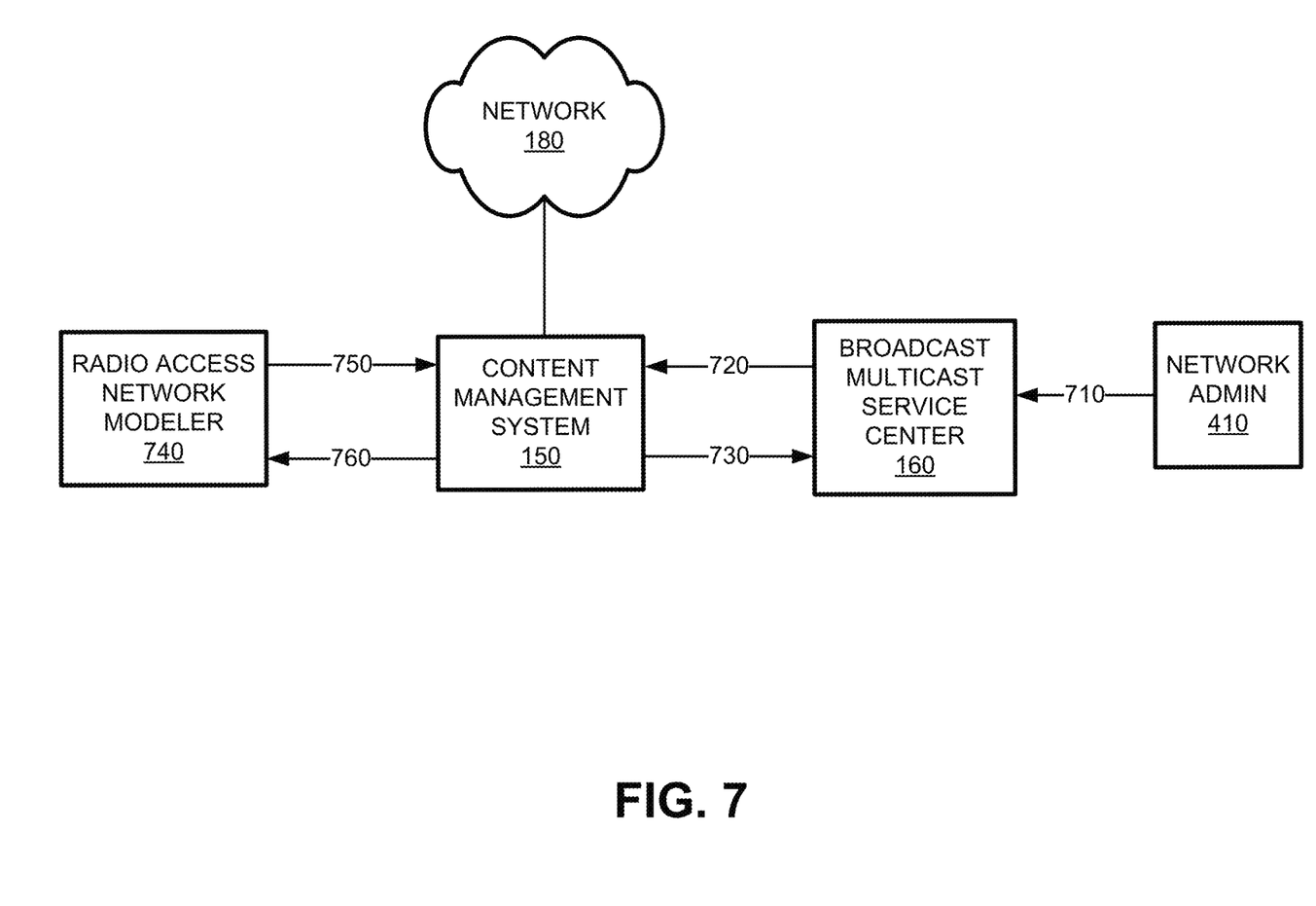
FIG. 7 is an example timing diagram according to an implementation described herein.

FIG. 7 is an example timing diagram according to an implementation described herein. As illustrated, example timing diagram 700 may include network administrator 410 configuring and forwarding an event 710 (e.g., stating that a program should be treated differently than other programs, as illustrated in FIG. 4 and discussed above) to BMSC 160. For example, as discussed above concerning block 310, events for reservation can be identified. BMSC 160 may send an event message 720 regarding the event to CMS 150. For example, BMSC 160 can generate a notification and send the notification to CMS 150 (see blocks 330 and 340 discussed above).

CMS 150 may send a message acknowledging receipt 730 of the event message from BMSC 160. For example, a confirmation of receipt of the notification from BMSC 160 may be sent to allow BMSC 160 to stop transmitting the event message 720 to CMS 150. Radio Access Network (RAN) modeler 740, which may monitor states of network congestion on network 180 and/or service provider network 140, and may also control bandwidths of one or more cells, may send a message indicating a congestion state of one or more cells 750 to CMS 150. CMS 150 may send a message 760 to reduce available bandwidth for one or more cells by a particular amount to RAN modeler 750. For example, as discussed in block 350, bandwidth can be reserved for an event. The reservation of bandwidth in block 350 can be done by using RAN modeler 750 to reduce available bandwidth for one or more cells by a particular amount to reserve the bandwidth for the event and also to adjust the bandwidth for channels (see block 370).

The systems and/or methods may provide a reservation or notification mechanism by which bandwidth can be reserved for an event. The systems and/or methods may use one or more devices to request and reserve bandwidth for the event. The event can be a transmission of a media stream or other event via broadcast or multicast that can follow a schedule to allow for the bandwidth to be reserved, according to the schedule, at specific start and stop times.

The foregoing description provides illustration and description, but is not intended to be exhaustive or to limit the implementations to the precise form disclosed. Modifications and variations are possible in light of the above disclosure or may be acquired from practice of the embodiments.

While a series of blocks has been described with regard to FIG. 3, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor and executing software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:
1. A system comprising:
one or more devices to:
identify an event that has a predefined start time and end time,
determine that a particular amount of bandwidth is needed for the event,
wherein determining the particular amount of bandwidth comprises at least one of:
determining the particular amount of bandwidth based on the number of user devices that will access the event, or determining the particular amount of bandwidth based on information for previous events similar to the event;
generate a notification that identifies the particular amount of bandwidth and the predefined start time and end time for the event,
where the particular amount of bandwidth is reserved on a channel for the predefined start time and end time, for the event, in response to the notification,
reserve bandwidth, in response to the notification for the event, for the channel on which content for the event is to be transmitted, and
dynamically determine whether bandwidth adjustments are needed for the channel or another channel in order to reserve the particular amount of bandwidth for the event.

2. The system of claim 1, where the one or more devices are further to:
transmit the content, for the event, at the predefined start time, and
adjust a bandwidth of at least one channel after the predefined start time and before the predefined end time,
where the at least one channel includes the channel or the other channel that is different from the channel.

3. The system of claim 2, where, when reserving bandwidth, the one or more devices are to at least one of:
reserve available bandwidth for the channel for the event,
adjust the bandwidth of the other channel to create available bandwidth, or
reserve unassigned bandwidth, for the channel and the other channel, for the event.

4. The system of claim 2, where the one or more devices include a content management system to reserve the channel before the predefined start time of the event and transmit the content on the channel at the predefined start time.

5. The system of claim 2, where the one or more devices comprises a content management system to adjust the bandwidth for the channel relative to the other channel to maximize throughput and minimize network congestion based on bandwidth demands for the channel and the other channel.

6. The system of claim 1, where, when identifying the event, the one or more devices are to at least one of:
determine that the particular amount of bandwidth needed for the event is more than a scheduled bandwidth for the channel between the predefined start time and end time, or
receive a notification, from a content provider or a network administrator, where the notifications include signals, messages, or alerts, and where the notifications identify the event, the predefined start time and end time, amount of demand, and an identified amount of bandwidth.

7. The system of claim 1, where the one or more devices include a broadcast multicast service center (BMSC) to generate a notification identifying the particular amount of bandwidth and the predefined start time and end time for the event, where the particular amount of bandwidth is reserved for the predefined start time and end time, for the event, in response to the notification by requesting bandwidth for the channel for the event relative to one or more bandwidth for one or more other channels that will be using bandwidth between the predefined start time and end time.

8. The system of claim 1, where the one or more devices are further to:
start an event media stream using the channel, and
stop transmission of the event media stream when the predefined end time for the event is reached.

9. The system of claim 8, where the one or more devices are further to:
remove bandwidth from the channel after the predefined end time, or
adjust the bandwidth for another channel after the predefined end time.

10. A method comprising:
identifying an event that has a predefined start time and end time;
determining that a particular amount of bandwidth is needed for the event,
wherein determining the particular amount of bandwidth comprise at least two of:
determining the particular amount of bandwidth based on the number of user devices that will access the event,
determining the particular amount of bandwidth based on content provider information associated with demand for the event, or
determining the particular amount of bandwidth based on information for previous events similar to the event;
generating a notification that identifies the particular amount of bandwidth and the predefined start time and end time for the event,
where the particular amount of bandwidth is reserved on a channel for the predefined start time and end time, for the event, in response to the notification,
reserving bandwidth, in response to the notification, for the channel on which content, for the event is to be transmitted; and
determining whether bandwidth adjustments are needed for the channel or another channel in order to reserve the particular amount of bandwidth for the event.

11. The method of claim 10, further comprising:
transmitting the content, for the event, at the predefined start time; and
adjusting a bandwidth of at least one channel after the predefined start time and before the predefined end time, where the at least one channel includes the channel or another channel different from the channel.

12. The method of claim 11, where the reserving bandwidth includes:
reserving available bandwidth for the channel for the event,
adjusting the bandwidth of the other channel to create available bandwidth, and
reserving unassigned bandwidth, for the channel and the other channel for the event.

13. The method of claim 11, where the adjusting bandwidth includes:
adjusting the bandwidth for the channel relative to the other channel or other channels to maximize throughput and minimize network congestion based on bandwidth demands for the channel and the other channel.

14. A system comprising:
a broadcast multicast service center (BMSC) to:
identify an event that has a predefined start time and end time;
determine that a particular amount of bandwidth is needed for the event,
wherein determining the particular amount of bandwidth comprises at least two of:

determining the particular amount of bandwidth based on the number of user devices that will access the event, determining the particular amount of bandwidth based on provider information, or determining the particular amount of bandwidth based on information associated with previous events similar to the event, and generate a notification that identifies the particular amount of bandwidth and the predefined start time and end time for the event, where the particular amount of bandwidth is reserved on a channel for the predefined start time and end time, for the event, in response to the notification; and a content management system (CMS) to:

reserve bandwidth in response to the notification for the channel on which content, for the event is to be transmitted, transmit the content, for the event, at the predefined start time, and adjust a bandwidth of at least one channel after the predefined start time and before the predefined end time, where the at least one channel includes the channel or another channel.

15. The system of claim 14, where, when reserving bandwidth, the CMS is to:

reserve available bandwidth for the channel for the event, and adjust the bandwidth of the other channel to create available bandwidth, and reserve the available bandwidth for the channel for the event.

16. The system of claim 14, where, when adjusting the bandwidth, the CMS is to:

adjust the bandwidth for the channel relative to the other channel to maximize throughput and minimize network congestion based on bandwidth demands for the channel and the other channel.

17. The system of claim 14, where, when identifying the event, the CMS is to:

determine that the particular amount of bandwidth needed for the event is more than a scheduled bandwidth for the channel between the predefined start time and end time, and receive a notification, from a content provider or a network administrator, where the notifications include signals, messages, or alerts, and where the notifications identify the event, the predefined start time and end time, amount of demand, and an identified amount of bandwidth.

18. A method, comprising:

identifying, by a broadcast multicast service center (BMSC), an event that has a predefined start time and end time;

determining, by the BMSC, that a particular amount of bandwidth is needed for transmission of event content associated with the event based on at least one of determining the particular amount of bandwidth based on the number of user devices that will access the event, or information associated with previous events similar to the event;

generating, by the BMSC, a notification that identifies the particular amount of bandwidth and the predefined start time and end time for the event;

sending, from the BMSC to a content management system (CMS), the notification for the event;

determining, by the CMS, whether to adjust a plurality of channels in order to reserve the particular amount of bandwidth for the event;

reserving, by the CMS, the particular amount of bandwidth for the event between the predefined start time and end time according to the notification; and transmitting, by the BMSC to the CMS, the event content at the predefined start time.

* * * * *